United States Patent
Huang

[11] Patent Number: 5,820,978
[45] Date of Patent: Oct. 13, 1998

[54] DURABILITY IMPROVED COLLOIDAL SILICA COATING

[75] Inventor: Tzu-Li J. Huang, Woodbury, Minn.

[73] Assignee: Minnesota Mining and Manufacturing Company, St. Paul, Minn.

[21] Appl. No.: 556,064

[22] Filed: Nov. 9, 1995

[51] Int. Cl.⁶ ..................................................... B32B 5/16
[52] U.S. Cl. ........................... 428/331; 428/336; 428/404
[58] Field of Search ................................... 428/323, 331, 428/403, 404, 332, 336

[56] References Cited

U.S. PATENT DOCUMENTS

| | | | |
|---|---|---|---|
| 2,765,242 | 10/1956 | Alexander et al. | 252/313 |
| 2,913,419 | 4/1959 | Alexander | 252/313 |
| 2,974,108 | 3/1961 | Alexander | 252/313 |
| 3,649,322 | 3/1972 | Foss | 106/300 |
| 4,374,158 | 2/1983 | Taniguchi et al. | 427/41 |
| 4,409,285 | 10/1983 | Swerdlow | 428/332 |
| 4,478,909 | 10/1984 | Taniguchi et al. | 427/41 |
| 4,481,254 | 11/1984 | Fukushima et al. | 428/329 |
| 4,536,420 | 8/1985 | Rickert, Jr. | 427/257 |
| 4,576,864 | 3/1986 | Krautter et al. | 428/328 |
| 4,755,425 | 7/1988 | Huang | 428/331 |
| 4,772,488 | 9/1988 | Pinch et al. | 427/39 |
| 4,844,976 | 7/1989 | Huang | 428/323 |
| 4,885,332 | 12/1989 | Bilkadi | 524/714 |
| 5,073,404 | 12/1991 | Huang | 427/39 |
| 5,104,929 | 4/1992 | Bilkadi | 524/847 |
| 5,134,021 | 7/1992 | Hosono et al. | 428/213 |

FOREIGN PATENT DOCUMENTS

| | | | |
|---|---|---|---|
| 0 051 405 | 5/1982 | European Pat. Off. | |
| 0 052 427 A1 | 5/1982 | European Pat. Off. | C09D 1/00 |
| 0 149 182 A2 | 12/1984 | European Pat. Off. | C09K 3/18 |
| 54-20979 | 2/1979 | Japan | C09K 3/18 |
| 62-64882 | 3/1987 | Japan | C09K 3/18 |
| 62-64884 | 3/1987 | Japan | C08K 3/18 |
| 3-50288 | 3/1991 | Japan | |
| 2 249 041 | 4/1992 | United Kingdom | |

OTHER PUBLICATIONS

Derwent Publication, Japan 79–23144b, 16 Feb. 1979.
Derwent Publication, Japan 87–119233, 19 Mar. 1987.
Derwent Publication, Japan 87–120103, 23 Mar. 1987.
*Effect of Adsorbed Alumina on the Solubility of Amorphous Silica in Water*, R.K. Iler, Journal of Colloid and Interface Science, vol. 43, No. 2, pp. 399–408, May 1973.
*Introduction to Infrared and Raman Spectroscopy*, Norman B. Colthup et al., Third Edition, pp. 358–363, 1990.
*Visual Impact Performance Reflective Sheeting Series 3990*, Product Bulletin 3990, 3M Traffic Control Materials Division, Apr. 1994.

*Primary Examiner*—H. Thi Le
*Attorney, Agent, or Firm*—Karl G. Hanson; David R. Cleveland

[57] ABSTRACT

A silica-based water-spreading coating having surfaces of silica particles coated with a metal oxide. The metal comprises aluminum, gallium, germanium, tin, indium, arsenic, antimony or vanadium. The water-spreading coating may be applied to a retroreflective sheeting on a traffic sign.

23 Claims, 3 Drawing Sheets

DURABILITY IMPROVED COLLOIDAL SILICA COATING

TECHNICAL FIELD

The present invention relates to coatings containing silica particles, such as anti-dew or water-spreading coatings, having enhanced durability and methods for making such coatings.

INTRODUCTION

Articles having surfaces capable of spreading water, and thus preventing the formation of water droplets on the surface of the article, are desirable for a variety of uses. For example, transparent plastics used in misty or humid environments, such as greenhouses, should avoid the formation of water droplets on the transparent plastics. Water-spreading surfaces on these materials helps to make them more transparent and avoids undesirable streaking.

Water-spreading characteristics are also desirable on traffic signs that employ retroreflective sheeting. Retroreflective sheeting has the ability to return substantial quantities of incident light back towards the light source. Frequently, light transmission to and from a retroreflective sheeting is impaired by precipitation.

A prominent form of precipitation that affects light transmission is dew formation. Dew can be particularly problematic because it occurs predominantly at nighttime when the retroreflective sheeting is operative. When present on a traffic sign in the form of small beaded water droplets, dew can highly disrupt the path of incident and retroreflective light. This can make information on the sign much more difficult for passing motorists to read. In contrast, when the dew is spread out over the surface of the retroreflective traffic sign, the information on the sign is easier to read because the resulting thin layer of water does not misdirect the path of incident and retroreflective light to as great an extent.

There are numerous prior art examples in which water-spreading coatings are formed by dispersing silica particles in a binder and applying this water-spreading layer to a substrate such as a transparent plastic. U.S. Pat. No. 4,576,864 to Krautter et at. discloses a water-spreading layer that is composed of colloid particles of a metal or silicon oxide in which the water-spreading layer is adhered to a plastic substrate by an adhesive comprising a non-water-soluble, organic-solvent-soluble, and essentially non-swellable, polar-group-containing-polymer. U.S. Pat. No. 4,478,909 to Taniguchi et al. discloses an anti-fogging coating having finely divided silica particles dispersed in a matrix of polyvinyl alcohol and an organosilicon alkoxy compound or hydrolysates thereof. A similar coating is also described in U.S. Pat. No. 5,134,021 to Hosono et al.

Other films are known in which there is a mixture of oxide particles. U.S. Pat. No. 4,409,285 to Swerdlow discloses a water-spreading coating composition comprising a mixture of large and small inorganic particles. The inorganic particulate components may be colloidal silica and/or alumina. U.S. Pat. No. 4,481,254 to Fukushima et al. discloses an agricultural plastic film comprising an olefin resin and an amorphous hydrated aluminum silicate gel. U.S. Pat. No. 3,649,322 to Foss describes durability improved paint systems in which titania particles are coated with an aluminum silicate. Japanese Patent Kokai Publication No. HE13-50288 to Yamagishi et al. discloses an anti-fogging composition comprising a mixture of positively charged colloidal silica and alumina particles along with a water-soluble aluminum salt and a nonionic surfactant. The examples utilize solutions containing aluminum chloride ($AlCl_3$) or aluminum nitrate ($Al(NO_3)_3$).

Water-spreading surface coatings have also been used to improve the performance of retroreflective traffic signs under dew conditions. U.S. Pat. Nos. 5,073,404, 4,844,976 and 4,755,425 to T. Huang disclose a retroreflective sheeting that has a transparent coating comprising colloidal silica and a polymer selected from aliphatic polyurethanes, polyvinyl-chloride copolymers and acrylic polymers. The colloidal silica is disposed in the polymer at about 10–80 weight % (10–70 weight % in the case of polyacrylates). The transparent coatings provide superior dew repellency, allowing the retroreflective sheeting to retain a higher percentage of its original brightness after being exposed to moisture.

A problem with water-spreading surface coatings, especially silica-based coatings, comes in the area of durability and weathering resistance. Heat, temperature variations, humidity, ultraviolet radiation, pollution—especially acid rain, as well as fungus and microorganism growth—all can adversely affect the performance of water-spreading coatings. A complicating factor in producing durable water-spreading surface coatings is the highly complex nature of the surface chemistry, reaction chemistry and solution chemistry of colloidal silica and colloidal silica films. For example, the interaction of ions with the silica surface is not fully understood despite extensive study (See Iler, "The Chemistry of Silica," John Wiley, 1979 p. 665.) Despite such difficulties, a silica-based water-spreading film that has enhanced durability is provided in accordance with the invention described below.

SUMMARY OF THE INVENTION

The present invention provides a durable, water-spreading layer coated thereon, wherein the water-spreading layer comprises silica particles, wherein at least a portion of the silica particles have surfaces that have metal oxides disposed thereon, wherein the metal of the metal oxide is selected from the group consisting of aluminum, gallium, germanium, tin, indium, arsenic, antimony and vanadium; and wherein the water-spreading layer exhibits durability such that, as measured by attenuated total reflectance-infrared spectrocopy (hereinafter "ATR-IR"), at least 35% of the absorbance of the Si—O stretching at 1108 $cm^{-1}$ remains after soaking for three days in water at 160° F. (71° C.).

The present invention also provides a durable, water-spreading article comprising a substrate that has a water-spreading layer coated thereon that comprises silica particles, wherein at least a portion of the silica particles have been treated with an aqueous solution comprising at least one water-soluble metal oxide anion in which the metal is one or more of: aluminum, gallium, germanium, tin, indium, arsenic, antimony, and vanadium.

The present invention further provides an article having a substrate, and a water-spreading layer that comprises silica particles and a concentration gradient of a metal selected from the group consisting of aluminum, gallium, germanium, tin, indium, arsenic, antimony, and "vanadium" and "such" vanadium such that the region of the water-spreading layer near the surface has a higher concentration of the metal than the region of the water-spreading layer further from the surface (i.e., nearer the substrate).

The present invention also provides a method of making an article having a substrate and a durable, water-spreading coating disposed on a substrate. The method comprises applying a colloidal silica coating onto the substrate wherein at least a portion of the colloidal silica is treated with a solution of a water soluble metal oxide anion in which the metal of the metal oxide anion is selected from the group consisting of aluminum, gallium, germanium, tin, indium, arsenic, antimony, vanadium, and combination thereof.

The present invention further provides a method in which the surface of a water-spreading layer containing silica particles is treated with an aluminum-containing aqueous solution.

The articles and methods of the present invention offer multiple advantages. The invention provides a water-spreading layer having extraordinary durability. This durable, water-spreading layer can be made simply and economically. The layer can be prepared with a low cure/dry temperature and short cure time. The durable, water-spreading layer also can be made without adding acid or alumina particles and without counterions that may be troublesome to dispose of. Additionally, the inventive articles can provide good resistance to soil, acid rain, fungus and microorganism growth.

These and other features of the present invention are more fully shown and described in the drawings and detailed description of this invention, where like reference numerals are used to represent similar parts. It is to be understood, however, that the description and drawings are for the purposes of illustration and should not be read in a manner that would unduly limit the scope of this invention.

DETAILED DESCRIPTION OF THE INVENTION

Figure 1:
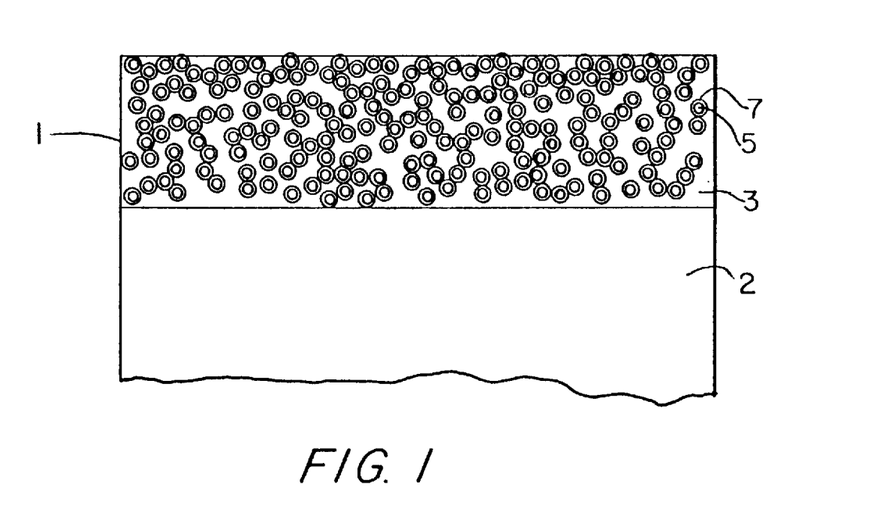
FIG. 1 is a cross-section of an article having a water-spreading coating in accordance with a first embodiment of the present invention.

FIG. 1 illustrates one embodiment of the invention where a water-spreading layer 1 is disposed on a substrate 2. The water-spreading layer 1 comprises a polymeric binder matrix 3. Colloidal silica particles 5 are randomly and preferably uniformly dispersed throughout the matrix and have a surface region 7 that is coated with a metal oxide anion.

Figure 2:
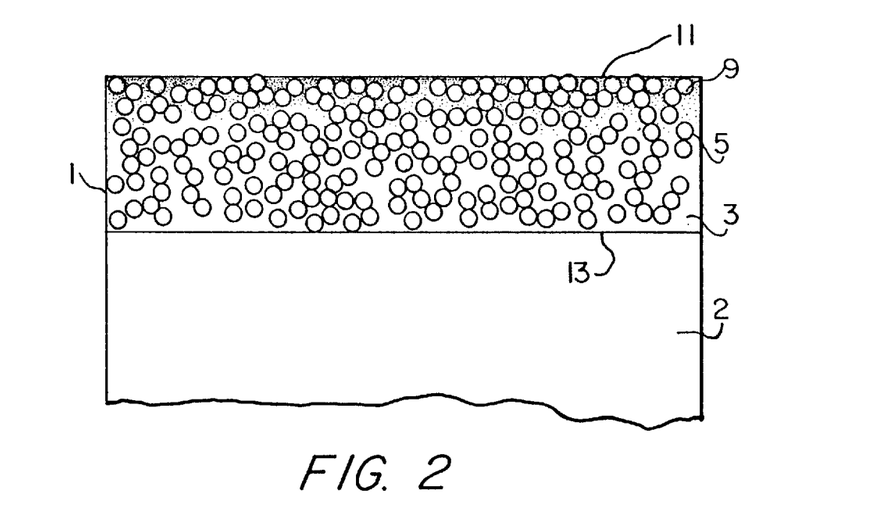
FIG. 2 is a cross-section of an article having a water-spreading coating in accordance with a second embodiment of the present invention.

FIG. 2 illustrates a second embodiment of the invention where a water-spreading layer 1 is disposed on a substrate 2, and the water-spreading layer 1 is treated with an aqueous solution of a water soluble metal-containing compound to form a top region 9 on the water-spreading layer. The metal of the metal-containing compound may comprise Al, Ga, Ge, In, Sn, As, Sb, V, or combinations thereof. The shaded region 9 illustrates a higher concentration of the metal near the surface 11 of the water-spreading layer as compared with the surface 13 near the substrate. Thus, water-spreading layer 1 of FIG. 2 possesses a gradient of metal decreasing from the top or first major surface 11 through the interior to the bottom or second major surface 13. The shaded region does not represent a difference in coloration or the presence of fine particles near the surface.

In general, the colloidal silica-containing water-spreading layer can be prepared from compositions known in the art, with the modification that a metal ion of Al, Ga, Ge, In, Sn, As, Sb, or V is added to these compositions. In a preferred embodiment, the added metal is aluminum. Compositions suitable for use in forming the water-spreading layer include the silica-based water-spreading layers described in U.S. Pat. Nos. 4,576,864; 4,478,909; 5,134,021; 4,409,285; 4,755,425; 4,844,976; 5,073,404; and co-pending U.S. patent application Ser. No. 08/246,187, all of which are wholly incorporated herein by reference.

The water-spreading layers of the present invention contain silica particles that are typically derived from colloidal silica dispersions. Useful colloidal silica dispersions preferably contain negatively-charged silica particles. Layers formed from negatively-charged particles can demonstrate better durability. Positively-charged silica particles contain counterions such as chlorine that may lead to corrosion or other undesirable reactions. Examples of suitable colloidal silica dispersions include Nyacol™ 1440 colloidal silica, having a particle size of about 14 nm and a concentration of 40 weight % silica, available from Nyacol Products, Inc., Ashland, Md.; Nalco™ 1140 silica, having a particle size of about 15 nm and a concentration of 40 weight % silica in water, available from Nalco Chemical Company, Oakbrook, Ill.; Nalco™ 2327 having average silica particle size of 20 nm; Nalco™ 2326 having average silica particle size of 5 nm; and Ludox™ AS having an average particle size of 22 nm, available from E. I. DuPont de Nemours, Wilmington, Del. The colloidal silica particles may also contain metals, such as aluminum. For example, Ludox™ AM from DuPont, which is a colloidal silica dispersion in which some of the silicon atoms have been replaced by aluminum atoms, may be used to form the water-spreading layer. The colloidal silica dispersion is preferably suspended in water, but polar solvents or mixtures of water and solvents such as an alcohol may also be used.

The silica particles of the water-spreading layer may be dispersed in a polymeric binder such as described in U.S. Pat. Nos. 5,073,404; 4,844,976; and 4,755,425. Preferred polymeric materials include aliphatic polyurethanes, polyvinylchloride co-polymers having a minor portion of a comonomer containing a carboxylic acid or hydroxyl moiety, and acrylic polymers. In many applications, it is preferred that the polymeric materials are capable of transmitting visible light. In retroreflective applications, the polymer (and the resulting water-spreading layer) is preferably capable of transmitting at least 80 percent, more preferably 90 percent, of the intensity of visible light incident upon it. Other preferred polymeric materials are the adhesives described in U.S. Pat. No. 4,576,864. Particular, preferred polymeric materials suitable for use in the water-spreading layers of the present invention include: NeoRez™ R-960 and R-963 polyurethanes from Zeneca Resins, Wilmington Mass.; Sancure™ 774, 847, 899, and A-1364 available from Zancor Chemical Co., Leominster, Mass.; Permuthane™ U-6729 urethane resin from Permuthane Coatings, Peabody, Mass.; VROH or VMCH or VAGH polyvinylchloride copolymers available from Union Carbide Corporation; and NeoCryl™ A601, A612 and A614 acrylic polymer available from Zeneca Resins in aqueous emulsions. The amount of polymeric binder in the water-spreading layer is generally 0–85% by weight, and preferably 0–60% by weight of the water-spreading layer. In some embodiments, it is desirable to minimize the amount of polymeric binder in order to enhance hydrophilicity. Thus, in some embodiments the amount of polymeric binder is preferably less than 20%, more preferably less than 10%, and still more preferably less than 3% by weight. In embodiments with little or no binder, the thickness of the water-spreading layer is preferably 0.05–1.0 μm, and more preferably 0.1 to 0.5 μm.

In other embodiments, it is desirable to incorporate larger amounts of polymeric binder. Incorporating polymeric binders into the water-spreading layer also can enable thicker coatings to be applied and can provide greater flexibility to the water-spreading layer to prevent cracking. In applications such as those in which flexibility and/or greater thickness are desired, the water-spreading layer desirably contains 5 to 85 weight % of polymeric binder, preferably 15 to 50 weight %, and still more preferably 20 to 40 weight %. In this embodiment, the water-spreading layer has a thickness of about 0.1 to 100 μm, preferably 0.2 to 15 μm, and most preferably 0.3 to 5 μm. When a polymeric binder is added to the water-spreading layer, it is preferable to treat the surface of the water-spreading layer with a treatment that increases the ratio of inorganic to organic material on the exposed surface of the water-spreading layer. The exposed surface may be corona treated, plasma treated, chemically treated such as with a solution or chemical etchant, ozone treated or excimer laser treated. See co-pending U.S. patent application Ser. No. 08/246,187.

Various additives that also may be incorporated into the composition of the water-spreading layer include surfactants, ultraviolet (UV) light stabilizers, UV absorbers, curing agents, coupling agents, etc. Preferred surfactants include "Fluorad" brand anionic fluorochemical surfactants (potassium perfluoroalkyl sulfonates) available from 3M Corporation, St. Paul, Minn. Suitable UV absorbers include benzotriazoles, benzophenones, oxanilides, and aryl benzoates. One suitable UV light absorber is Uvinyl™ N-539 (2-ethylhexyl-2-cyano-3,3-diphenylacrylate) available from GAF, New York, N.Y. In addition to UV absorbers, suitable UV stabilizers include hindered amines and phenolic antioxidants. Suitable UV absorbers and stabilizers include Tinuvin™ 292, 328 and 1130 available from Ciba-Geigy Corp. of Ardsley, N.Y. Preferred coupling agents are silane coupling agents. Examples of silane coupling agents include amino-, epoxy or mercapto-functional silanes (or siloxanes) and the coupling reagents described in U.S. Pat. No. 5,258,225, incorporated herein by reference. Preferred concentration ranges for additional components in the water-spreading layer are 0–3 and more preferably 0.5–3.0 weight % of surfactant, 1–6 weight % of UV stabilizer, 1–6 weight % of UV absorber, 0–4 weight % of curing agent, and 2–10 weight % of coupling agent. One preferred coating comprises, by weight: about 40–95% silica particles, about 0.01 to 25% sodium aluminate, about 0–60% polymeric binder, about 2–10% silane coupling agent, and about 0–8% of UV stabilizer and absorbers.

The water-spreading layer of the present invention can be applied to a variety of substrates. Preferred substrates are plastic films such as those described in U.S. Pat. No. 4,576,864. Another preferred substrate is retroreflective sheeting. Retroreflective sheeting typically comprises a reflective surface and optical elements. The reflective surface serves to reflect incident light, and the optical elements serve to redirect the incident light toward the light source. The reflective material may comprise a specular metal reflector such as aluminum or silver (see, for example, U.S. Pat. No. 5,283,101) or a diffuse reflector such as heavy metal pigments or a polymeric material wherein reflectance is caused by a difference in refractive indices at an interface (frequently a plastic-air interface). Optical elements typically come in one of two forms: beaded lens elements and cube corner elements. Examples of retroreflective sheeting that employ beaded lens elements have been disclosed in U.S. Pat. Nos. 2,407,680, 3,190,178, 4,025,159, 4,896,943, 5,064,272, and 5,066,099. Examples of retroreflective sheeting that employ cube corner elements have been disclosed in U.S. Pat. Nos. 3,684,348, 4,801,193, 4,895,428, 4,938,563, and 5,272,562. Disclosures of the patents cited in this paragraph are incorporated in their entirety here by reference. When the substrate is composed of plastic, it is preferably treated with a corona discharge prior to applying the water-spreading layer in order to enhance adhesion of the water-spreading layer.

The water-spreading layers of the present invention exhibit enhanced durability. In a preferred embodiment, water-spreading layers of the present invention exhibit at least 50% of the water-spreading layer remains (as measured by ATR-IR absorbance of the Si—O absorbance at about 1108 cm$^{-1}$) after immersion for two days in deionized water at 160° F. In another preferred embodiment, at least 35% of the water-spreading layer remains after three days of immersion in deionized water at 160° F., more preferably at least 40%, and still more preferably at least 50% of the water-spreading layer remains after three days of immersion in deionized water at 160° F. It is also preferred that the static contact angle of stationary water droplets on the surface of the water-spreading layer remains below 40°, more preferably less than 30°, and still more preferably less than 20°.

To produce the water-spreading layer shown in FIG. 1, an aqueous dispersion containing colloidal silica particles can be mixed with metal oxide anions such as $AlO_2^-$, $GaO_2^-$, $GeO_2^-$, $InO_2^-$, $SnO_2^-$, $AsO_3^-$, $SbO_3^-$, and $VO_3^-$. Typically, an aqueous solution containing the metal oxide anion is added to an aqueous dispersion of colloidal silica, stirred, coated onto a substrate, and dried. The aqueous dispersion typically contains additional components such as binders, silane coupling agents, UV stabilizers, etc.

The above-described colloidal dispersion may be applied to the substrate using many known methods including spraying, rolling, and brushing. The methods described in U.S. Pat. Nos. 4,576,864; 4,478,909; 5,134,021; 4,409,285; 4,755,425; 4,844,976; 5,073,404; and co-pending U.S. patent application Ser. No. 08/246,187 may also be used. In one preferred method, the water-spreading layer is placed on a corona-treated plastic substrate surface. In another preferred embodiment, an adhesive (e.g., hot melt, pressure sensitive, etc.) is disposed on the surface of the substrate and the water-spreading layer is disposed on the adhesive.

The water-spreading articles of the present invention can be applied to many substrates. For example, they may be placed on retroreflective sheetings, agricultural films, windows, eyeglasses, goggles, etc.

The metal oxide anion preferably is present in the aqueous dispersion at 0.1 to 30 parts, based on the dry weight of 100 parts colloidal silica; more preferably at 0.25 to 20 parts; and most preferably at 0.5 to 15 parts. The preferred ratio of metal oxide anion to silica in the water-spreading layer is the same as that in the aqueous dispersion. In a particularly preferred embodiment, the metal oxide anion is aluminate, and the ratio of aluminate to silica particles is at least 1:700 parts by weight. In general, small silica particles (1–10 nanometers (nm)) may use a higher amount of metal oxide while larger particles (10–30 nm) may use a lower amount.

When mixed in dispersions, the metal oxide anion typically uniformly coats the silica particles, and in some embodiments it is preferred that the colloidal silica particles in the water-spreading layer are uniformly coated with the metal oxide anion. It is desired that the metal oxide solution anion is added to the silica dispersion without causing any coagulation or precipitation during mixing. When using aluminate, the resulting mixture typically has a stable shelf life of more than six months. The pH of the colloidal dispersion is preferably maintained between about 7 to about 10.

In a preferred embodiment of the invention, the colloidal silica particles are treated with an aluminate solution. Preferred aluminates are sodium aluminate ($Na(AlO_2)$), potassium aluminate ($K(AlO_2)$), lithium aluminate ($Li(AlO_2)$), and ammonium aluminate ($NH_4(AlO_2)$). Sodium aluminate and potassium aluminate are most preferred because of advantages including solubility and availability.

The use of aluminate solutions to treat aqueous dispersions of colloidal silica particles provides results and advantages that are not obtainable from other aluminum-containing compounds. Alumina and alumino-silicate compounds are essentially insoluble in water and are ineffective in modifying the surface of the colloidal silica particles. It has been found that aluminate solutions are highly compatible with negatively-charged colloidal silica dispersions; this can be contrasted with other aluminum salts such as aluminum nitrate which causes coagulation and undesirable precipitation of the silica particles.

Better results can be obtained from water-spreading layers that have been prepared from aluminate mixed with colloidal silica particles than from layers prepared from colloidal silica particles mixed with other aluminum salts such as aluminum chloride or aluminum nitrate which cause coagulation. Thus, water-spreading layers prepared from negatively charged colloidal silica particles and aluminum chloride or aluminum nitrate are not suitably durable and can also be deficient in transparency and water-spreading effect. Moreover, the aluminate ion enters into the aqueous solution ready to react with the surface of the silica particles and the use of aluminate avoids the need to dispose of materials such as acetylacetonate (acac).

Water-spreading layers prepared from silica particles that have been mixed with an aluminate solution show enhanced durability as compared to water-spreading layers in which the silica particles have not been mixed with an aluminate solution. It is believed that the enhanced durability is due to the formation of a relatively inert aluminosilicate between silica particles and on the surface of the silica particles that serves to protect the silica particles from dissolution or other degradation mechanisms. The added aluminate does not form alumina particles and, in a preferred embodiment, the water-spreading layer does not contain alumina particles.

Regardless of the mechanism, it has been experimentally discovered that water-spreading layers consisting of colloidal silica particles disintegrated after immersion in deionized water at 160° F. (71° C.) for three days (see Example A in Tables 1–3 and FIG. 3). In contrast, an otherwise identical composition that contained negatively-charged colloidal silica that had with mixed with aluminate according to the methods of the present invention exhibited much less degradation under identical conditions (see Example C in Tables 1–3 and FIG. 4). Results obtained from aluminate-treated silica particles according to the present invention show markedly superior durability when compared with water-spreading layers made from commercially available surface-modified silica particles. For example, a water-spreading layer made from Ludox™ AM colloidal silica (Ludox™ AM is a negatively charged colloidal silica in which some of the surface silicon atoms have been replaced with aluminum atoms) disintegrates after immersion in water for three days at 160° F. (see Example H in Tables 1–3). More detailed information regarding the preparation and testing of the durability-improved coating is provided below in the Examples.

In the embodiment illustrated in FIG. 2, the water-spreading layer is typically applied onto the substrate and dried and cured before adding an aqueous solution containing a water-soluble metal containing compound, wherein the metal of the metal-containing compound comprises Al, Ga, Ge, In, Sn, As, Sb, or V. It is also possible, however, to treat the water-spreading layer with a water-soluble metal containing compound after it has been applied but before it has been dried and cured. Treating the water-spreading layer's surface with a water-soluble metal containing compound can be carried out by spraying, gravure coating, roll coating, dip coating, or a simple surface wiping with a wet towel or paint brush, or other known methods. Generally, the aqueous solution having a water soluble metal-containing compound wets the colloidal silica coating very well. A small amount of surfactant such as FC-135 (available from Minnesota Mining and Manufacturing, St. Paul, Minn.) also can be used to improve the wetting. The metal of the water soluble metal-containing compound preferably is aluminum. More preferably, the metal-containing compound is aluminate. The method for making the embodiment illustrated in FIG. 2 is also useful for improving the durability of commercially available materials that have a silica-based water-spreading layer such as Acrylic Film No. 99840 available from Rohm GmbH Chemiche Fabrik, Darmstadt, Germany (this film is believed to be described in U.S. Pat. No. 4,576,864).

EXAMPLES

The following non-limited Examples further illustrate the invention. These Examples are only a portion of multiple Examples that have been prepared. All parts, percentages, ratios, et cetera, in the Examples are by weight. The following abbreviations and tradenames are used throughout:

| | |
|---|---|
| NALCO ™ -2327 | An ammonium stabilized silica dispersion having a 40% solids content, 20 nm mean particle size, pH of 9.3 and surface area of 150 $m^2/g$ $SiO_2$, available from Nalco Chemical Co., Oakbrook, IL. |
| FC-95 | Potassium perfluoroalkylsulfonates available from 3M, St. Paul, MN. |
| DGS-3970G | 3M "Scotchlite ™" prismatic retroreflective sheeting, 3M St. Paul, MN. |
| Ludox ™ AM | Colloidal silica dispersion having some surface silica atoms replaced by aluminum atoms, sodium counterions, 12 nm average-particle |

|  |  |
|---|---|
| NaAlO$_2$ | size, pH of 9.9 and surface-area of 230 m$^2$g$^{-1}$, available from DuPont, Wilmington, DE.<br>Obtained as solid from Matheson, Coleman & Bell, Norwood, OH, and dissolved as a 5% solution in deionized water. |
| Silane A-187 | gamma-Glycidoxypropyltrimethoxysilane, available from OSI Specialties Inc., Lisle, IL. |
| NeoRez ™ | Aliphatic polyurethane aqueous dispersion believed to be derived from dicyclohexylmethane diisocyanate with a molecular weight exceeding 200,000 g/mol, available from Zeneca Resins, Wilmington, MA. |
| Tinuvin 292 | bis (1,2,2,6,6-pentamethyl-4-piperidinyl)sebacate, hindered amine light stabilizer, available from Ciba-Geigy Corp., Ardsley, NY. |
| Tinuvin 1130 | Reaction product of beta-(3-(2H-benzotriazol-2-yl)-4-hydroxy-5-text-butylphenyl)propionic acid, methyl ester and polyethylene glycol, available from Ciba-bergy. |
| NeoCry ™ A-614 | Aqueous acrylic dispersion, believed to be 1.0:0.47 weight ratio copolymer of methylmethacrylate: butyl methacrylate, available from Zeneca Resins;, Wilmington, MA. |
| XL-25 SE | A multifunctional carbodiimide low temperature crosslinking agent for carboxylated polymers, in propylene glycol monomethyl ether acetate, available from Union Carbide Corp., Lisle, IL. |

Aluminate Treated Silica Particles

A series of aqueous dispersions (Examples A–H) were coated onto plastic retroreflective sheeting. The compositions of Examples A–H are shown in Tables 1 and 2. Table 1 shows the net weight of each component (liquid+solid) prior to applying and drying the coating. Table 2 shows the weight of each solid component in the dried coating.

TABLE 1

SILICA-BASED, WATER-SPREADING COATING COMPOSITION
(total weight of starting components in grams)

| Component | Solids Content (weight %) | Examples | | | | | | | |
|---|---|---|---|---|---|---|---|---|---|
| | | A | B | C | D | E | F | G | H |
| Water | 0% | 942.0 | 938.5 | 933.2 | 924.5 | 907.0 | 872.0 | 837.0 | 925.3 |
| NALCO-2327 | 40% | 50.0 | 49.5 | 48.8 | 47.5 | 45.0 | 40.0 | 35.0 | 0.0 |
| Ludox-AM | 30% | 0.0 | 0.0 | 0.0 | 0.0 | 0.0 | 0.0 | 0.0 | 66.7 |
| NaAlO2 | 5% | 0.0 | 4.0 | 10.0 | 20.0 | 40.0 | 80.0 | 120.0 | 0.0 |
| Silane A-187 | 100% | 2.0 | 2.0 | 2.0 | 2.0 | 2.0 | 2.0 | 2.0 | 2.0 |
| FC-95 | 5% | 6.0 | 6.0 | 6.0 | 6.0 | 6.0 | 6.0 | 6.0 | 6.0 |
| TOTAL | | 1000 | 1000 | 1000 | 1000 | 1000 | 1000 | 1000 | 1000 |

TABLE 2

SILICA-BASED, WATER-SPREADING COATING COMPOSITION
(solids weight in grams)

| Component | Examples | | | | | | | |
|---|---|---|---|---|---|---|---|---|
| | A | B | C | D | E | F | G | H |
| NALCO-2327 | 20.0 | 19.8 | 19.5 | 19.0 | 18.0 | 16.0 | 14.0 | 0.0 |
| Ludox-AM | 0.0 | 0.0 | 0.0 | 0.0 | 0.0 | 0.0 | 0.0 | 20.0 |
| NaAlO2 | 0.0 | 0.2 | 0.5 | 1.0 | 2.0 | 4.0 | 6.0 | 0.0 |
| Silanc A-187 | 2.0 | 2.0 | 2.0 | 2.0 | 2.0 | 2.0 | 2.0 | 2.0 |
| FC-95 | 0.3 | 0.3 | 0.3 | 0.3 | 0.3 | 0.3 | 0.3 | 0.3 |
| TOTAL | 22.3 | 22.3 | 22.3 | 22.3 | 22.3 | 22.3 | 22.3 | 22.3 |

The Examples were prepared according to the following protocol (stirring was conducted in steps 2–5):

1. A desired amount of NALCO™-2327 was weighed out;
2. The NALCO-2327 was diluted with the indicated amount of deionized water;
3. Surfactant FC-95 (a 5 weight % solution in 50/50 volume ratio of isopropanol/water) was added to the dispersion;
4. Silane A-187 was then added;
5. The indicated amount of sodium aluminate was then added to the dispersion.
6. The resulting dispersions were coated out onto DGS-3970G retroreflective sheeting (pretreated with a corona discharge at 2.77 joule/cm$^2$ prior to the coating for enhanced coating adhesion) by a wire coating bar no. 3 having a wire diameter of 0.001 inch (24 micrometer). The coated substrate was then dried and cured in an oven at 200° F. (93° C.) for 5 minutes.

Durability Testing

The coated sheeting was cut into 1 inch (2.54 cm)×4 inch (10.2 cm) strips. The strips were immersed in separate glass jars filled with deionized water. The glass jars were covered with a polyethylene liner and a metal cap and were placed in an oven at 160° F. (71° C.).

Durability measurements were conducted by attenuated total reflectance—infrared spectroscopy (ATR-IR) on a Nicolet 5DXC FTIR with the incident beam fixed at 45°. Every 24 hours, the samples were removed from the hot water and dried at 140° F. for 10 minutes before the IR measurement. After each measurement, the samples were returned to the original glass jars, and the testing was continued.

In general, quantitative measurement by ATR-IR can be derived either from peak height or by peak area integration. For purposes of the present invention, quantitative measures of the durability of the water-spreading layer should be derived from the peak heights of the silica absorbances. The accuracy of quantitative ATR-IR measurements depends on sample handling. The sample should be smooth and pressed firmly to contact the ATR-IR cell crystal (ZnSe). Also, the penetration depth is wavelength dependent. The longer wavelength region has a deeper penetration than the short wavelength region. To correct such variation, it is recommended to use a close-by absorbance to calculate peak height ratios.

The ATR-IR beam is expected to penetrate to about a 2 $\mu$m depth. The silica solution coating thickness is about 0.2 $\mu$m. Therefore, the IR absorption bands are attributed to the silica coating and the underlying retroreflective sheeting that is made from polymethylmethacrylate ("PMMA"). The strong absorption at 1722 cm$^{-1}$ is attributed to the carbonyl group of the PMMA film. The strong absorption at about 1143 cm$^{-1}$ is attributable to C—O—C stretching of the PMMA. The weak absorption at 3700-3200 cm$^{-1}$ is attributable to the hydrogen bonding of Si—O—H. The additional absorbance bands at about 1108, 1067 and 809 cm$^{-1}$ are attributable to the silica coating. For a more detailed description of infrared spectroscopy see "Introduction to Infrared and Raman Spectroscopy" by Norman B. Colthup et al., 3rd edition, Academic Press (1990) and "Practical Sampling Techniques for Infrared Analysis" edited by Patricia B. Coleman, CRC Press (1993).

For each Example, a series of IR spectra were recorded. The DGS-3907G uncoated substrate was also recorded in each series of spectra. The results of the IR measurements are shown in Table 3.

TABLE 3

ATR-IR ABSORBANCE SPECTRA OF SILICA COATED SUBSTRATES

| Sample ID/Test (days) | Peak Height C = O@1722 | Normalized Peak Height @1108 | Normalized Peak Height @1067 | Normalized Peak Height @809 |
|---|---|---|---|---|
| A (0 day) | 0.13 | 1.07 | 0.93 | 0.27 |
| A (1 day) | 0.20 | 0.84 | 0.56 | 0.20 |
| A (2 day) | 0.32 | 0.71 | 0.47 | 0.18 |
| A (3 day) | 0.37 | 0.63 | 0.41 | 0.18 |
| Substrate (DGS-3970G) | 0.24 | 0.60 | 0.40 | 0.18 |
| B (0 day) | 0.12 | 0.94 | 0.81 | 0.23 |
| B (1 day) | 0.20 | 0.90 | 0.62 | 0.21 |
| B (2 day) | 0.16 | 0.83 | 0.54 | 0.20 |
| B (3 day) | 0.09 | 0.83 | 0.54 | 0.18 |
| Substrate (DGS-3970G) | 0.24 | 0.60 | 0.40 | 0.18 |
| C (0 day) | 0.12 | 0.91 | 0.79 | 0.23 |
| C (1 day) | 0.26 | 0.88 | 0.59 | 0.21 |
| C (2 day) | 0.19 | 0.86 | 0.57 | 0.20 |
| C (3 day) | 0.16 | 0.76 | 0.52 | 0.21 |
| Substrate (DGS-3970G) | 0.24 | 0.60 | 0.40 | 0.18 |
| D (0 day) | 0.22 | 0.85 | 0.70 | 0.22 |
| D (1 day) | 0.14 | 0.88 | 0.61 | 0.21 |
| D (2 day) | 0.11 | 0.86 | 0.58 | 0.20 |
| D (3 day) | 0.16 | 0.78 | 0.52 | 0.20 |
| Substrate (DGS-3970G) | 0.24 | 0.60 | 0.40 | 0.18 |
| E (0 day) | 0.18 | 0.97 | 0.84 | 0.28 |
| E (1 day) | 0.10 | 0.98 | 0.70 | 0.22 |
| E (2 day) | 0.15 | 0.90 | 0.65 | 0.23 |
| E (3 day) | 0.24 | 0.75 | 0.50 | 0.20 |
| Substrate (DGS-3970G) | 0.24 | 0.60 | 0.40 | 0.18 |
| F (0 day) | 0.28 | 0.95 | 0.75 | 0.27 |
| F (1 day) | 0.11 | 0.91 | 0.64 | 0.21 |
| F (2 day) | 0.26 | 0.77 | 0.53 | 0.20 |
| F (3 day) | 0.21 | 0.66 | 0.46 | 0.19 |
| Substrate (DGS-3970G) | 0.24 | 0.60 | 0.40 | 0.18 |
| G (0 day) | 0.10 | 0.93 | 0.72 | 0.24 |
| G (1 day) | 0.15 | 0.84 | 0.59 | 0.21 |
| G (2 day) | 0.14 | 0.77 | 0.52 | 0.20 |
| G (3 day) | 0.25 | 0.64 | 0.43 | 0.19 |
| Substrate (DGS-3970G) | 0.24 | 0.60 | 0.40 | 0.18 |
| H (0 day) | 0.24 | 0.92 | 0.79 | 0.26 |
| H (1 day) | 0.18 | 0.63 | 0.45 | 0.18 |
| H (2 day) | 0.33 | 0.55 | 0.38 | 0.17 |
| H (3 day) | 0.33 | 0.55 | 0.38 | 0.19 |
| Substrate (DGS-3970G) | 0.24 | 0.60 | 0.40 | 0.18 |

The values shown in Table 3 are the normalized peak heights in which absorbances at 1143, 1108, 1067 and 809 cm$^{-1}$ were normalized to the carbonyl absorption at 1722 cm$^{-1}$ (fixed at a constant value) and again normalized to the normalized substrate C—O—C absorption at 1143 cm$^{-1}$. As shown in Table 3, the best durability was observed for Examples B, C and D. Samples E, F and G show somewhat poorer stability than Examples B–D indicating that the addition of relatively large amounts of sodium aluminate results in lower durability as compared with the addition of relatively smaller amounts of sodium aluminate. The lowest durability was observed for the untreated Example A, which was prepared using Nalco™ 2327 colloidal silica, and the untreated Example H which was prepared using Ludox™-AM colloidal silica.

Figure 3:
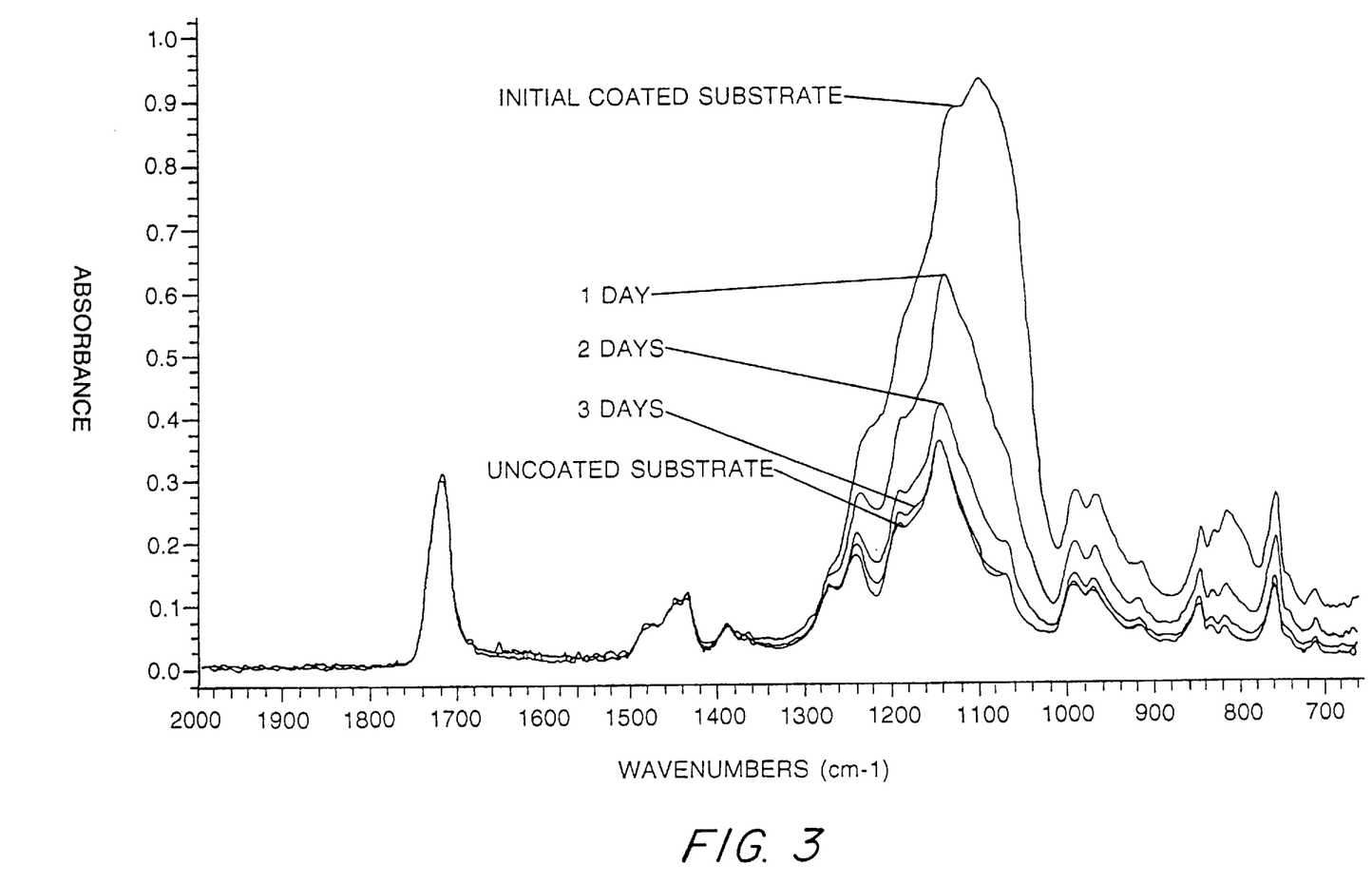
FIG. 3 shows a series of attenuated total reflectance-infrared ATR-IR spectra of a water-spreading layer made from Nalco™ 2327 colloidal silica, illustrating its stability and performance in water at 160° F. as a function of time.
Figure 4:
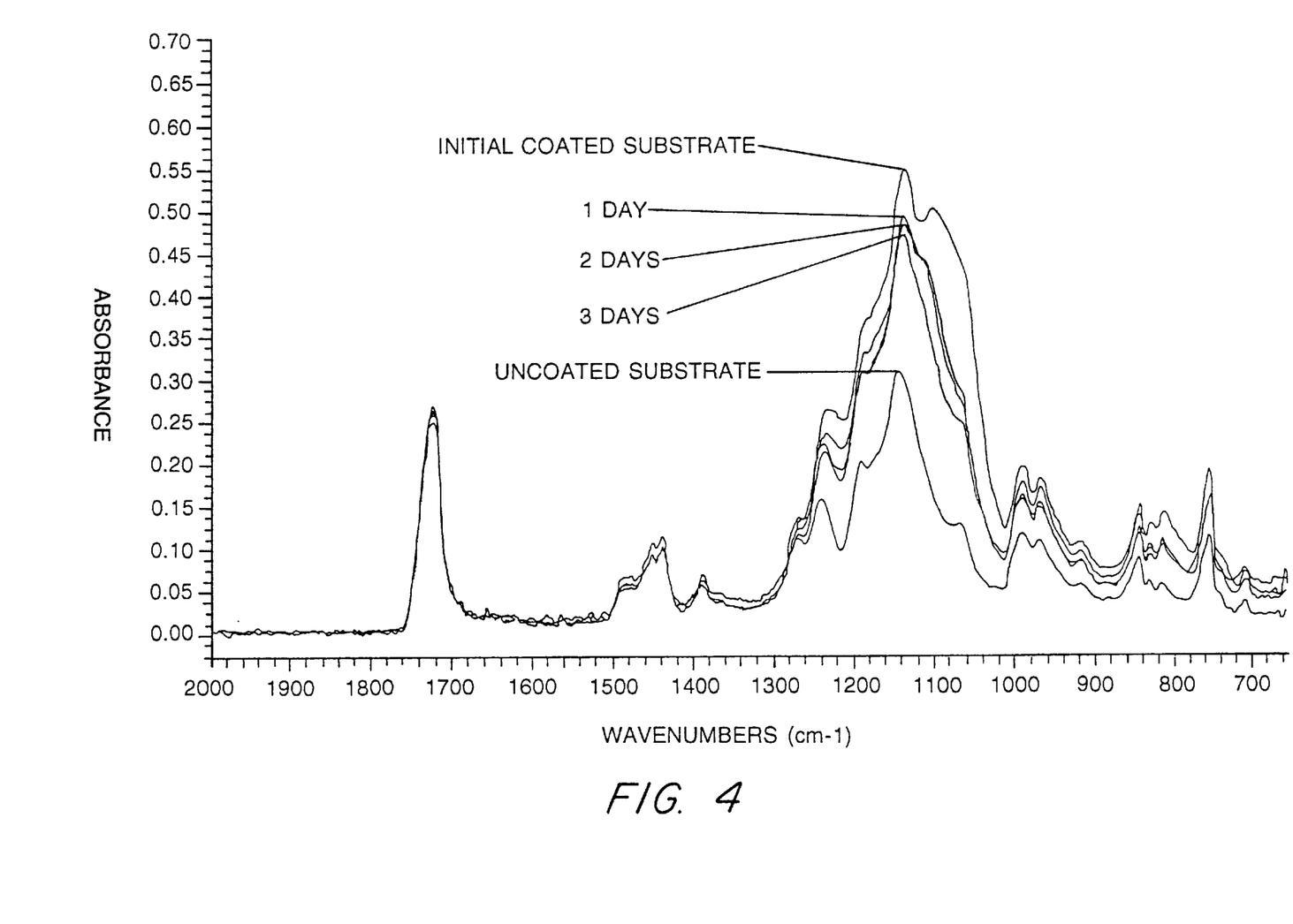
FIG. 4 shows a series of ATR-IR spectra of a water-spreading film made from Nalco™ 2327 particles that were mixed with sodium aluminate in accordance with the present invention, illustrating its stability and performance in water at 160° F. as a function of time.

The durability test results of Example A are also shown in FIG. 3 in which a series of IR spectra at 0, 1, 2 and 3 days and the substrate alone are shown in descending order of absorbance. After soaking for one day at 160° F. (71° C.), the IR spectrum exhibited about a 50% reduction in the absorbance of the silica coating at about 1108 cm$^{-1}$. After soaking for 2 days at 160° F., the spectrum showed that the absorbance of the silica coating was only about 6% that of the initial coating. The spectrum after 3 days is essentially identical to the substrate, indicating complete disintegration of the film. A comparable set of IR spectra for Example C are shown in FIG. 4. In Example C, the IR spectrum exhibited only about a 10% reduction in the absorbance of the silica coating at about 1108 cm$^{-1}$ after soaking for 1 day and only about 15% after 2 days and less than 50% after 3 days.

Static contact angles were measured on a water droplet of 0.01 ml with a contact angle goniometer (Rame Hart, Inc. Mountain Lakes, N.J., Model 100-00).

Binder-Containing Compositions

Table 4 shows compositions (liquid+solid) used to prepare durable, water-spreading layers containing polymeric binders (NeoRez™ and NeoCryl™), UV absorber (Tinuvin™ 1130), UV stabilizer (Tinuvin™ 292), a silane coupling agent and a crosslinking agent.

TABLE 4

SILICA-BASED, WATER-SPREADING COATING COMPOSITION
(total weight of starting components in grams)

| Component | Solids Content (weight %) | Examples | | | | |
|---|---|---|---|---|---|---|
| | | I | J | K | L | M |
| NeoRez R-960 | 33% | 50.0 | 50.0 | 50.0 | 50.0 | 50.0 |
| Tinuvin 292 | 100% | 10.5 | 10.5 | 10.5 | 10.5 | 10.5 |
| NeoCryl A-614 | 32% | 281.0 | 281.0 | 281.0 | 281.0 | 281.0 |
| Water | 0% | 200.0 | 200.0 | 200.0 | 200.0 | 200.0 |
| Tinuvin 1130 | 100% | 10.5 | 10.5 | 10.5 | 10.5 | 10.5 |
| Silane A-187 | 100% | 8.0 | 8.0 | 8.0 | 8.0 | 8.0 |
| NALCO2327 | 40% | 350.0 | 350.0 | 350.0 | 350.0 | 350.0 |
| NaAlO2 (Aqueous) | 5% | 0.0 | 0.2 | 1.0 | 4.0 | 16.0 |
| Water | 0% | 320.0 | 320.0 | 320.0 | 320.0 | 320.0 |
| X-linker XL-25 | 50% | 12.0 | 12.0 | 12.0 | 12.0 | 12.0 |
| SE | | | | | | |
| TOTAL | | 1234.0 | 1234.2 | 1235.0 | 1238.0 | 1250.0 |

The water spreading layers in Table 4 were prepared according to the following protocol (components listed in order of addition, all additions made with stirring): 1) NeoRez R-960 was weighed out; 2) Tinuvin-292 was added with stirring; 3) NeoCryl A-614 was added; 4) water; 5) Tinuvin-1130; 6) Silane A-187; 7) Nalco-2327; 8) sodium aluminate solution; 9) water was added to dilute to about 23 weight % (generally between 20–25 weight %); and 10) crosslinker XL-25 SE. The surface of sheeting DGS-3970G was pretreated with a corona discharge at 1.11 joule/cm². The solution was coated with a wire coating bar no. 3 having a wire diameter of 24 microns. The coated substrates were dried and cured in an oven at 200° F. (93° C.) for 5 minutes. The coated samples were further treated with a high energy corona discharge of 7.75 joule/cm² with 2 passes to remove the top surface of hydrophobic binder material. The coated sheeting was then laminated on a 7 mil (178 micron) thick polyester film via the pressure sensitive adhesive on the DGS-3970G sheeting. Sample strips were soaked in deionized water at 160° F. (71° C.) and monitored by ATR-IR. After soaking for 3 days, samples I, J and K exhibited almost a complete loss of silica from the surface. In contrast, the IR spectra of samples L and M exhibited strong silica absorptions indicating that the silica particles on the surface of these samples remained intact.

Surface Treatment with Sodium Aluminate

A comparative study was done illustrating the effect of treating the surface of a water spreading layer with a sodium aluminate solution. Water-spreading acrylic film was purchased from Rohm GmbH Chemische Fabrik Company, Darmstadt, Germany (Acrylic Film No. 99840). This film has a thin layer of colloidal silica particles coated on the surface. Durability experiments were conducted by laminating the acrylic film onto the top surface of a reflective sheeting (3M Scotchlite Diamond Grade Series 3970) using a clear acrylic pressure sensitive adhesive (3M Scotch brand HI-Performance Laminating Adhesive No. 9172 MP). The bottom surface of the reflective sheeting was then laminated onto a 175 micrometer thick polyester film via adhesive on the bottom layer of the reflective sheeting. An identically prepared sample of the same film was treated with an aqueous solution of sodium aluminate (3 weight percent, coated onto the film with a wire coating bar no. 3 having a wire diameter of 0.001 inch (24 µm)), and dried in a forced air oven at 200° F. (93° C.) for 5 minutes.

The sodium aluminate treated and untreated samples were tested by immersion in water at 160° F. and monitored by ATR-IR spectroscopy as described previously. The untreated film exhibited sharply reduced silica absorbencies after immersion for 22 hours. After immersion for 46 hours, the IR spectrum indicated that none of the silica remained on the acrylic film. In contrast, the sodium aluminate treated film was virtually unchanged after immersion in water at 160° F. for 72 hours.

Comparison with testing under environmental conditions has shown that immersion in hot water is a good model for testing the durability of water-spreading layers to environmental conditions. The Acrylic Film No. 99840 was placed on a weathering deck in Florida inclined at 45° for one year of exposure. The water-spreading layer on untreated areas of the film could easily be wiped off and the water-spreading effect thus destroyed. In contrast, areas of film that had been coated with an aluminate solution could not easily be wiped away and thus retained their water-spreading characteristics.

Various modifications and alterations of this invention will become apparent to those skilled in the art without departing from the scope and spirit of this invention. For example, the embodiments shown in FIGS. 1 and 2 include a polymeric binder but some water-spreading layers of the present invention can be made without a polymeric binder. It therefore should be understood that this invention is not unduly limited to the illustrative embodiments set forth above, but is to be controlled by the limitations set forth in the claims and equivalents thereof

What is claimed is:

1. A durable, water-spreading article comprising a substrate having a water-spreading layer coated thereon, the water-spreading layer comprising silica particles, at least a portion of the silica particles having surfaces that have metal oxides disposed thereon, wherein the metal of the metal oxide is selected from the group consisting of aluminum, gallium, germanium, tin, indium, arsenic, antimony and vanadium; and wherein the water-spreading layer exhibits durability such that, as measured by ATR-IR, at least 35% of the absorbance of the Si—O stretching frequency at about 1108 cm$^{-1}$ remains, after soaking for three days in deionized water at 160° F.

2. The durable, water-spreading article of claim 1 wherein the metal is aluminum.

3. The durable, water-spreading article of claim 2, wherein after soaking for three days at 160° F., at least 40% of the absorbance of the water-spreading layer at 1108 cm$^{-1}$ remains and the static contact angle of water droplets on the water-spreading layer is less than 20°.

4. The durable, water-spreading article of claim 3 wherein after soaking for three days at 160° F., at least 50% of the absorbance of the water-spreading layer at 1108 cm$^{-1}$ remains.

5. The durable, water-spreading article of claim 2 wherein the water-spreading layer does not contain alumina particles.

6. The durable, water-spreading article of claim 2 wherein the water-spreading layer has a thickness of about 0.1 to 15 micrometers.

7. The durable, water-spreading article of claim 2 wherein the water-spreading layer consists essentially of colloidal silica particles treated with an aluminate solution, a silane coupling agent, and a surfactant.

8. The durable, water-spreading article of claim 2 wherein the substrate comprises retroreflective sheeting.

9. The durable, water-spreading layer of claim 2 wherein the water-spreading layer comprises less than 10% by weight of organic components.

10. The durable, water-spreading article of claim 1 wherein the silica particles have a negative surface charge.

11. The durable, water-spreading article of claim 10 wherein the water-spreading layer comprises, by weight of the solid:

about 40% to about 95% silica particles, about 0.01% to about 25% aluminate and about 0% to about 60% of a binder.

12. The durable, water-spreading layer of claim 11 wherein the aluminate is present in a weight ratio of at least 1 part aluminate to 700 parts silica particles.

13. The durable, water-spreading layer of claim 11 wherein the water-spreading layer comprises 15 to 50 weight % polymeric binder.

14. A durable, water-spreading article comprising a substrate having a water-spreading layer coated thereon wherein the water-spreading layer comprises silica particles and wherein at least a portion of the surface of the water-spreading layer has been treated with an aqueous solution comprising at least one water soluble metal oxide anion wherein the metal of at least one metal oxide is selected from the group consisting of aluminum, gallium, germanium, tin, indium, arsenic, antimony, vanadium and combinations thereof.

15. The durable, water-spreading article of claim 14 wherein the aqueous solution comprises aluminate.

16. The durable, water-spreading article of claim 15 wherein the water-spreading layer comprises an organic binder and wherein the surface of the water-spreading layer has been treated with a corona discharge to remove some of the organic binder from the surface of the water-spreading layer.

17. The durable, water-spreading article of claim 16 wherein the water-spreading layer has a bottom surface adjacent to a surface of the substrate and an exposed top surface wherein the top surface has been treated with an aqueous aluminate solution.

18. The durable, water-spreading article of claim 15 wherein the water-spreading layer comprises, by weight of the solid:

about 40% to about 95% silica particles, about 0.01% to about 25% aluminate and about 0% to about 60% of a binder.

19. The durable, water-spreading article of claim 15 wherein the substrate comprises retroreflective sheeting.

20. A durable, water-spreading article comprising a substrate having a water-spreading layer coated thereon, wherein the water-spreading layer comprises silica particles and wherein the water-spreading layer has a bottom surface adjacent to the substrate, an interior region, and a top surface, wherein the interior region closest to the top surface has a higher concentration of a metal ion than the interior region closest to the substrate; wherein the metal ion is selected from the group consisting of aluminum, gallium, germanium, tin, indium, arsenic, antimony, vanadium and combinations thereof.

21. The durable, water-spreading article of claim 20 wherein the metal ion is aluminum.

22. The durable, water-spreading article of claim 21 wherein the water-spreading layer comprises a binder and the outer surface of the water-spreading layer has a higher concentration of silica particles than the interior of the water-spreading layer.

23. The durable, water-spreading article of claim 21 wherein the water-spreading layer is durable such that, as measured by ATR-IR, at least 35% of the Si—O stretching frequency absorbance at 1108 cm$^{-1}$ remains after soaking in deionized water at 160° F. for three days.

* * * * *